US007092230B2

(12) United States Patent
Inauen

(10) Patent No.: US 7,092,230 B2
(45) Date of Patent: Aug. 15, 2006

(54) INTERFERENCE FILTER AND LIGHTNING CONDUCTOR DEVICE

(75) Inventor: Marcel Inauen, Appenzell (CH)

(73) Assignee: Huber & Suhner AG, Herisau (CH)

( * ) Notice: Subject to any disclaimer, the term of this patent is extended or adjusted under 35 U.S.C. 154(b) by 0 days.

(21) Appl. No.: 10/518,970

(22) PCT Filed: May 22, 2003

(86) PCT No.: PCT/CH03/00329

§ 371 (c)(1),
(2), (4) Date: Dec. 21, 2004

(87) PCT Pub. No.: WO2004/004064

PCT Pub. Date: Jan. 8, 2004

(65) Prior Publication Data

US 2005/0243493 A1 Nov. 3, 2005

(30) Foreign Application Priority Data

Jun. 26, 2002 (CH) .................................... 1100/02

(51) Int. Cl.
*H01C 7/12* (2006.01)
*H02H 1/00* (2006.01)
*H02H 3/22* (2006.01)

(52) U.S. Cl. ...................................... 361/119; 361/120

(58) Field of Classification Search ................ 361/119, 361/120
See application file for complete search history.

(56) References Cited

U.S. PATENT DOCUMENTS 5,982,602 A * 11/1999 Tellas et al. ................ 361/119
6,529,357 B1 * 3/2003 Landinger et al. ......... 361/91.1

FOREIGN PATENT DOCUMENTS

WO PCT/CH01/000617 * 8/2003

OTHER PUBLICATIONS

PCT/CH2003/000329; Int'l Filing Date: May 22, 2003; Priority Date: Jun. 26, 2002.

* cited by examiner

*Primary Examiner*—Phuong T. Vu
*Assistant Examiner*—Scott Bauer
(74) *Attorney, Agent, or Firm*—Notaro & Michalos PC

(57) ABSTRACT

The interference suppression filter and lightning current diverter device (1) comprises an inner conductor (3) and a housing (2) disposed approximately coaxially with it. At both ends of the housing (2) connectors (7, 8) are provided for the connection of coaxial lines. Coaxially with the inner conductor (3) is disposed in a hollow space (32) at least one pair of two lines (5, 6), which form a connection between inner conductor (3) and housing (2). The two lines (5, 6) are disposed parallel and spaced apart from one another, the directions of flow of the currents in the two lines (5, 6) being directed counter to one another. This configuration permits the improved diversion of interference pulses or interference signals to ground, and residual voltages and residual energies are largely eliminated.

20 Claims, 9 Drawing Sheets

INTERFERENCE FILTER AND LIGHTNING CONDUCTOR DEVICE

FIELD AND BACKGROUND OF THE INVENTION

The invention relates to an interference suppression filter and lightning current diverter device in a coaxial line for transmitting high-frequency signals, comprising a housing with two connectors, the housing forming an outer conductor connected to ground, and an inner conductor guided through the housing, as well as a connection between inner conductor and housing.

Interference suppression filter and lightning current diverter devices of this type are known. They serve for the purpose of protecting assemblies, apparatus or installations connected to lines, for example coaxial lines of telecommunication devices, against electromagnetic pulses, overvoltages and/or lightning currents. Electromagnetic pulses of artificial type can be generated for example by motors, switches, clocked power supply units or also in connection with nuclear events, and pulses of natural origin can be formed, for example, as a consequence of direct or indirect lightning strikes. The known protective circuits are therein disposed on the input side of the assemblies, apparatus or installation, and these circuits can be diverting or reflecting systems.

An EMP diverter of this type is disclosed in EP 938 166. This EMP diverter comprises a housing serving as outer conductor and connected to ground. In a first portion of this housing, which extends in the direction of introduction axis of a coaxial cable, is carried an inner conductor. In a second housing portion, which projects at right angles from the first housing portion, is disposed a connection in the form of a λ/4 shortcircuit line, which connects the inner conductor with the housing. With this known T-configuration it is already possible to attain with suitable known geometric configurations and implementations very good protection of the connected apparatus, assemblies or installations. EMP diverters of this type must meet international standards and fulfill for example the test conditions according to the IEC Standard (International Electronic Commission).

In spite of the good effectiveness, diverters of this type have the disadvantage that a residual voltage, and therewith also a residual energy, is still delivered via the inner conductor to the connected assemblies, apparatus or installations. Since only one contact point of the shortcircuit line to the housing exists, the current carrying capacity is also limited. A further disadvantage comprises that the housing portion, incorporation the λ/4 shortcircuit conductor and arranged at right angles to the inner conductors, is relatively large and leads to a bulky constructional size of this diverter. The installation of such diverters often presents considerable difficulties due to the λ/4 shortcircuit conductor projecting at right angles, and appropriate distances between adjacent structural elements must also be maintained. This structural shape can also not be covered with shrinkable tubing against environmental effects, but rather, in practice, corrosion protection tape is wound around it. This leads to increased costs.

A diverter in a more compact mode of constructing is disclosed in DE 199 36 869. In this apparatus on the housing a chamber is attached, which is disposed in a tangential plane at a radial spacing and approximately parallel to the inner conductor. As a connection between inner conductor and housing, a shortcircuit conductor of specific length is located in this chamber in a circular or spiral configuration.

This implementation leads to a reduction of the radial structural dimensions of the apparatus. With this solution there is also the disadvantage that, due to the line inductance, residual voltage, and therewith also a residual energy, is transferred or is conducted further via the inner conductor. Since also only one contact point exists between shortcircuit conductor and housing, the capacity for carrying current is also limited.

SUMMARY OF THE INVENTION

The object of the present invention therefore is providing an interference suppression filter and lightning current diverter device, in which the remaining residual pulses and residual energies are additionally reduced and the maximum current carrying capacity can be increased. Furthermore, the housing does not have any additional structural parts projecting at right angles and the entire device is developed such that it is compact and largely axially symmetrical.

This object is attained in connection with the preamble of patent claim 1 according to the invention through the characterizing characteristics of patent claim 1. Advantageous further developments of the invention are evident based on the characteristics of the dependent patent claims.

In the solution, or device according to the invention a connection between inner conductor and housing is formed by at least two conductors extending at least partially parallel, which are insulated with respect to one another. The ends of these conductors have each a contact element with respect to the inner conductor and to the housing and these contact elements are disposed such that the direction of flow of the currents in the two conductors is counterdirected.

This configuration yields the advantage that, upon the occurrence of interference pulses or interference signals, which are formed for example through lightning strikes or another event and are diverted to ground via the two lines, the residual voltages and the residual energies are also largely eliminated. The two parallel and counterdirected lines are coupled closely with one another and through the mutual induction effect residual voltages and residual pulses, respectively, and residual energies are largely cancelled. Utilizing two lines offers the further advantage that two contact elements or contact points with the housing or to ground, respectively, are available and therewith interference surge currents of twofold magnitude can be diverted to ground.

The induction effect between the two lines leads to the fact that the residual voltages and the residual energies, which occur at the output of the device, are at least considerably reduced and, with optimal implementation, are largely eliminated.

Comparison measurements utilizing a traditional device with λ/4 shortcircuit lines projecting at right angles for the same frequency ranges show that in the solution according to the invention the residual voltage pulse can be reduced, for example, by the factor 8 and the residual energy for example by the factor 60. These factors can vary within a wide range depending on the mode of construction and the selection of the material of the individual structural elements; however, in every case a considerable reduction of the residual pulse and the residual energy occurs.

An additional advantageous solution comprises that the two lines are disposed approximately parallel to the inner conductor and on a cylindrical surface concentric with the inner conductor. The two contact elements of both lines, connected with the inner conductor, are disposed in the direction of the longitudinal axis of the inner conductor at a spacing from one another, such that the two lines, starting from these contact elements or contact sites, are counterdirected to one another.

In this configuration the longitudinal axes of the inner conductor and of the two lines run approximately parallel to the longitudinal axis of the device or of the housing, respectively. All essential structural elements of the device are therein arranged about the longitudinal axis of the housing such, that the housing can be developed concentrically with respect to the longitudinal axis.

This configuration leads to a compact cylindrical implementation of the device, in which the input and output for the cables or the corresponding connectors are located on the same axis and the latter coincides with the longitudinal axis of the device. The length of the device can also be reduced in this embodiment according to the invention, since the two lines are disposed between inner conductor and housing such that they overlap.

The disposition of the inner conductor and the two lines, which form a pair in a cylindrical core hollow space of the housing, leads to a solution which is simple in production and can readily be mounted. A further advantageous solution is generated thereby that the inner conductor is disposed in a cylindrical core hollow space and each of the lines, forming a pair, in an additional hollow space in the housing. This makes possible a greater bandwidth and adaptation of the bandwidth by changing the form and position of the hollow spaces. The two lines forming a pair can be arranged in both solutions at different angular intervals relative to one another, which leads to advantageous and simple adaptation capabilities with respect to the desired properties, in particular to an optimum coupling of the two lines. This angular interval is measured in a radial plane with respect to the inner conductor or to the longitudinal axis of the device.

Through the installation of different dielectrics, known per se, between inner conductor and housing as well as between the lines and the housing, respectively the inner conductor, the electrical and electromagnetic properties of the device can be changed and be adapted to specified operation conditions. The dielectric elements are also structured simply and developed compactly.

The disposition of the two lines forming a pair on a shell surface extending parallel to the inner conductor makes possible an advantageous cylindrical mode of construction of the device. But the line pairs can also lie in parallel radial planes or in the form of a loop in a concentric shell surface or in a tangential housing plane or surface. A requirement is that the two lines of a pair extend approximately parallel in a partial region and the currents in both lines are counterdirected.

The disposition of two lines extending concentrically and at a spacing to the inner conductor also permits a mode of construction shortened in the axial direction of the inner conductor. Each of the two lines lies in a radial plane, these two radial planes being disposed approximately at right angles to the inner conductor and spaced apart from one another. The contact elements with respect to the inner conductor at one end of each of the two lines are directed approximately radially inwardly and serve for the connection with the inner conductor. The contact elements with respect to the housing at the two other ends of the lines are directed approximately radially outwardly and serve for the connection with the housing.

Thereby two parallel ring lines are formed about the inner conductor, with the contact elements with the inner conductor or the housing, respectively, being disposed such that the current in each of the two lines flows in the opposite direction.

The loop-form configuration of two parallel lines in a concentric shell surface or in a parallel tangential housing plane makes additional constructional variants possible. The loopform guidance of the lines corresponds to a convolution in the direction of the longitudinal axis of the inner conductor and thereby a shortened structural form is also obtained in this advantageous solution. On one end each of the two lines contact elements are directed approximately radially inwardly and establish the connection with the inner conductor. At the two other ends contact elements are directed approximately radially outwardly and establish the connection with the housing. According to the invention here also the contact elements are disposed such that in the two parallel line loops each of the currents flows in the opposite direction.

An advantageous solution consists therein that the two lines between inner conductor and housing are $\lambda/4$ shortcircuit lines. Additional advantages of the solution according to the invention result thereby that the two shortcircuit lines do not have the length of normal $\lambda/4$ diverters, but rather the geometric length of the shortcircuit lines can be shortened through the disposition according to the invention and the implementation of the connection areas between the inner conductor and the two shortcircuit lines at their outer ends. So-called electrically elongated $\lambda/4$ shortcircuit lines are formed. In an equivalent circuit diagram each shortcircuit line has a capacitance and an inductance, which are effective in parallel.

Through this implementation a more broadband effective range of the apparatus results, for example for high-frequency signals in the range of 1.7–2.5 GHz. Adaptations to other frequency ranges are possible in a broad range through variations in a manner known per se of the capacitances and inductances on the inner conductor and on the shortcircuit lines. By installing a series capacitor into the inner conductor and specifically at the connection side to the apparatus part, a highpass filter is formed and potentially still present and already reduced residual energies can still be further reduced. The considerable reduction of the residual pulses through the solution according to the invention makes it feasible to omit precision protection circuits, such as are necessary in other known solutions.

In addition to the compact and concentric mode of construction, the solution according to the invention permits the installation of additional pulse-diverting elements between the ends of the two lines and the housing. As additional pulse-diverting elements, for example voltage-diverting or voltage-limiting elements, such as gas discharge diverters, varistors or diodes can be employed, these elements being decoupled in the operating frequency range of the device. This configuration consequently permits the transmission of DC feed voltages. With a tuned parallel combination of a voltage-limiting element, for example a gas discharge diverter and a voltage-diverting element, for example a varistor or a TransZorb diode, the response behavior of the device can be improved, the extinction reliability can be increased as well as the dynamic response voltage can be kept low. The device with the disposition of two conductors with their current flow directed oppositely also leads to the RF decoupling of the additional pulse-diverting elements, without the intermodulation behavior being impaired.

BRIEF DESCRIPTION OF THE DRAWINGS

In the following the invention will be explained in greater detail in conjunction with embodiment examples with reference to the attached drawing. Therein depict.

DESCRIPTION OF THE PREFERRED EMBODIMENTS

Figure 1:
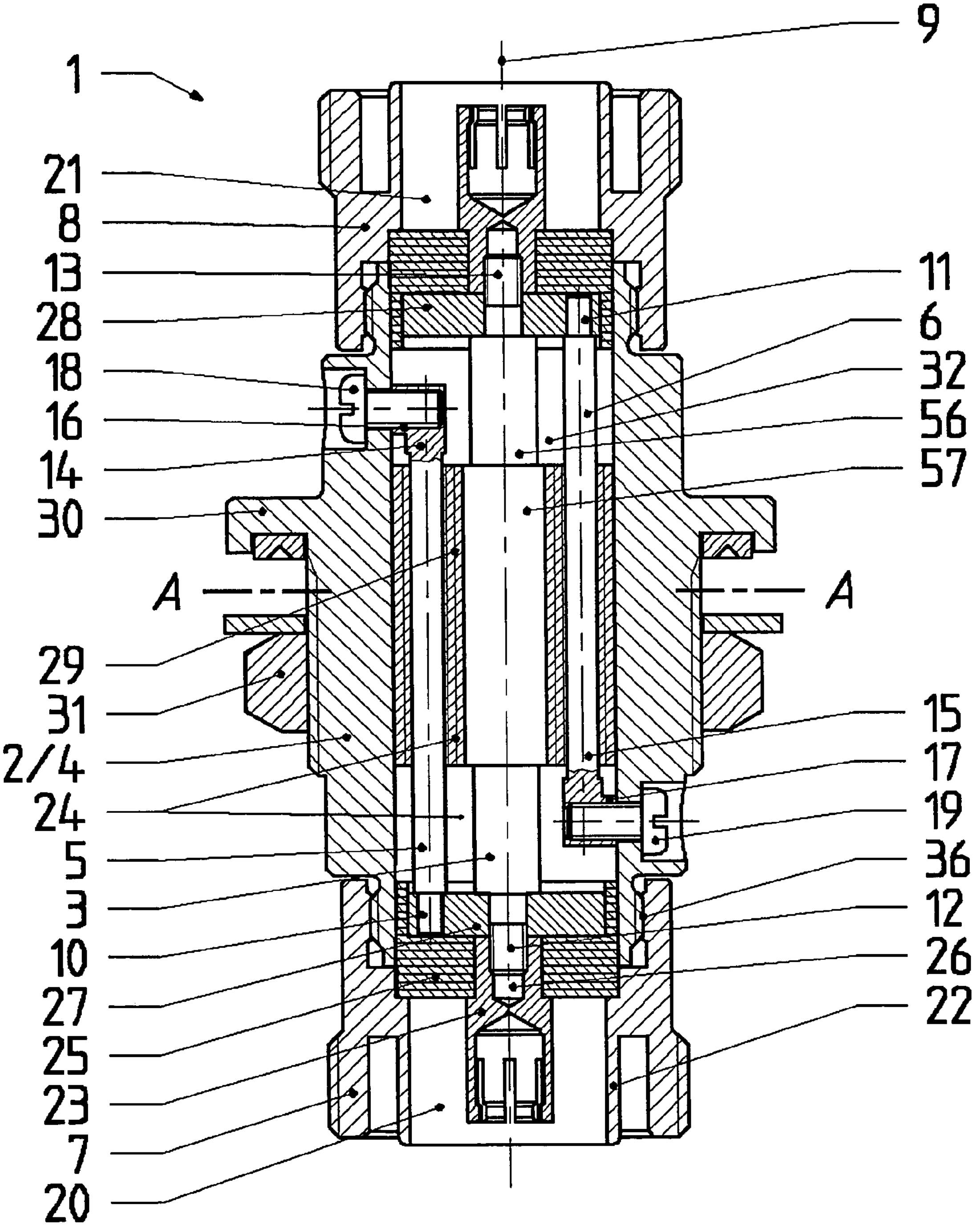
FIG. 1 longitudinal section through a device according to the invention with a core hollow space in the housing, FIG. 2 cross section through the housing of the device according to FIG. 1, FIG. 3 longitudinal section through a device according to the invention with a core hollow space and an additional hollow space in the housing, FIG. 4 cross section through the housing of the device according to FIG. 3, FIG. 5 schematic illustration of an embodiment with two ring-form lines, FIG. 6 schematic illustration of an embodiment with loop-form lines, FIG. 7 equivalent circuit diagram for the devices according to the invention, FIG. 8 equivalent circuit diagram for the devices according to the invention with an additional highpass filter, and FIG. 9 equivalent circuit diagram for the devices according to the invention with an additional voltage-diverting and a voltage-limiting element.

FIG. 1 depicts a longitudinal section through an interference suppression filter and lightning current diverter device 1 with connectors 7, 8 for coaxial cables on both sides. The coaxial cable is not shown and serves, for example, as the connection between an antenna and a transmission/receiving installation with appropriate apparatus. The connectors 7, 8 are structural elements known per se and to some extent standardized, and comprise connection elements at the input side 20 as well as at the output side 21, in order to connect, on the one hand, the inner conductor of the cable via elements 23 with the inner conductor 3 of device 1 and, on the other hand, the outer conductor of the cable via a mechanical connection 22 with the housing 2. The housing 2 forms the outer conductor 4 of the device 1. The connection elements 23 are both disposed on the longitudinal axis 9 of the device 1 or of the housing 2, respectively, and are stayed in housing 2 via insulator disks 25. The inner regions 26 of the two connection elements 23 are connected with one end each of the inner conductor 3 via connection sites 12, 13. In the present example, this involves a threaded connection. These connection sites 12, 13 are simultaneously connected so as to be electrically conducting with one disk 27, 28 each. These disks 27, 28 form contact elements and are formed of an electrically conducting material, in particular metal, for example, brass. The housing 2 includes a cylindrical core hollow space 32.

Centrally through this core hollow space 32 extends the inner conductor 3. Parallel with the inner conductor 3 and spaced apart from it are disposed two lines 5, 6 forming a pair. These lines 5, 6 are also disposed in the core hollow space 32 and are spaced at a distance from the inner conductor 3 as well as from the housing 2. At least a portion of the interspace between lines 5, 6, on the one hand, and the inner conductor 3 and the housing 2, on the other hand, is occupied by an insulation body 29. The two conductors 5, 6 overlap at least partially and are each on one inner end 10, 11 electrically connected with one of the disks 27, 28. The other, outer end 14, 15 of each of the two lines 5, 6 is electrically connected with the housing via a contact part 16, 17 and a connection element 18, 19. Lines 5, 6 are developed as λ/4 shortcircuit conductors. Potential interference currents or interference signals flow from the inner conductor 3 across the contact elements or disks 27, 28 and through lines 5, 6 to the connection elements 18, 19 on housing 2.

Through the disposition according to the invention of lines 5, 6 the flow directions of the currents in the parallel regions of the two lines 5, 6 are counterdirected to one another. If interference pulses or interference signals, generated through lightning strike or another electromagnetic event, are diverted via the two counterdirected lines 5, 6 to ground or the housing 2, through the close coupling of lines 5, 6 a residual voltage through the induction effect is cancelled to the greatest possible extent. As a consequence, the residual pulses and residual energies occurring at the output of the device are to the greatest extent eliminated. In comparison to a known lightning current diverter device of the same bandwidth with a λ/4 shortcircuit conductor branching at right angles from the inner conductor, it is feasible in the solution according to the invention to reduce the residual voltage pulse, for example, by the factor 8 and the residual energy, for example, by the factor 60. These reduction factors can be varied within a broad range through the mode of construction and the selection of the material of the individual structural elements of the device according to the invention. Across the two locally separated connection or contact sites 18, 19 with respect to the housing 2 interference surge currents of twice the magnitude can be diverted to ground.

Partial regions of the inner conductor 3 and the lines 5, 6 are surrounded by air spaces in the core hollow space 32 in housing 2. These air spaces and the insulation body 29 form various dielectrics. The inner conductor 3 has varying geometric deviations over its length, whereby differing reactance values or inductances and capacitances are formed.

In a manner known per se, by adaptation of the geometric dimensions of the lines 5, 6 and the associated portions of disks 27, 28, the frequency range and the bandwidth for the desired application range of the device can be determined. The two connectors 7 and 8 at the two ends of device 1 serve, via the threaded connections 36, also for the purpose of mounting and bracing the inner conductor 3 and the remaining structural elements in the core hollow space 32 of the housing 2. The housing 2 is furthermore equipped with a flange 30 and a threaded connection 31 in order to introduce it, for example, through a lead-through in an electrically conducting apparatus wall and to fasten it.

The diversion of the pulses in this case takes place via this electrically conducting apparatus wall with respect to potential equalization.

Figure 2:
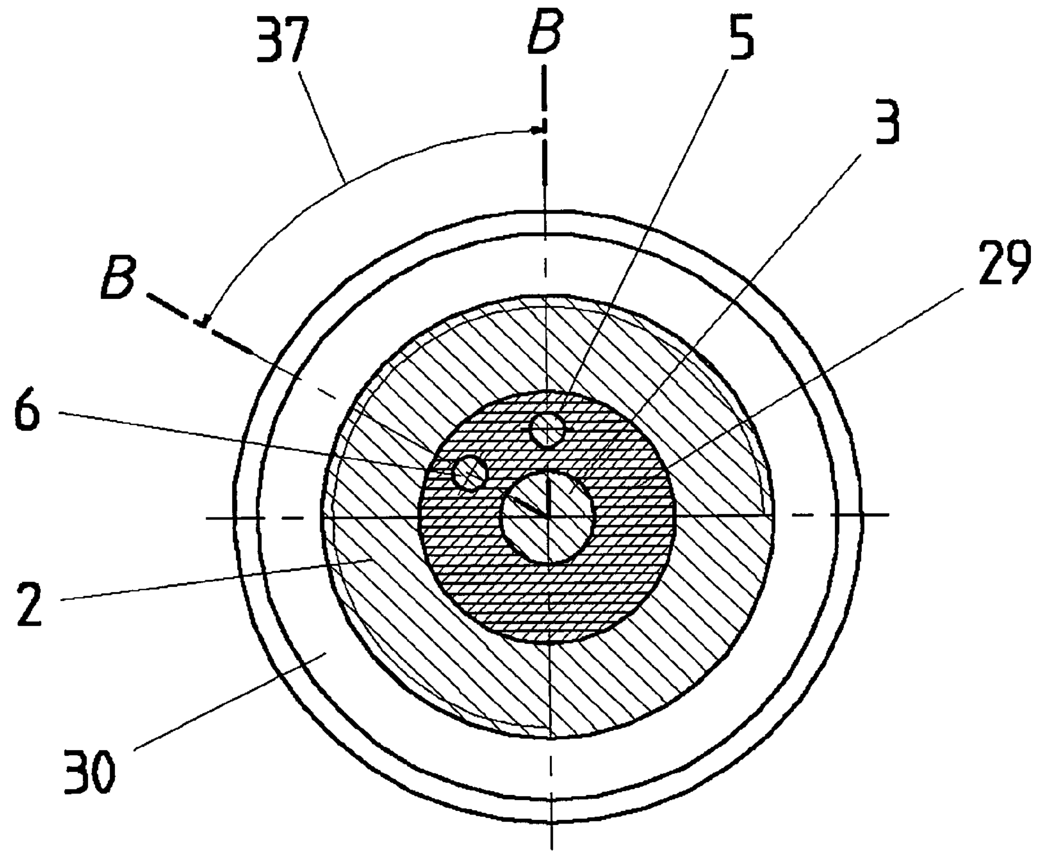

FIG. 2 shows a cross section through device 1 along line A—A in FIG. 1. It is evident that the two lines 5, 6 forming a pair are disposed spaced apart from one another and on a cylindrical surface concentric with the inner conductor. These two lines 5, 6 have an angular interval of 30°, measured in the depicted radial plane with respect to the inner conductor 3. This angular interval 37 can be in a range between 180° and a minimal interval necessary to ensure the insulation between both lines 5, 6. In the depicted example an interval 37 of 60° was selected. The two lines 5, 6, as well as also the inner conductor 3, are in this sectional region embedded into the insulation body 29, which occupies the core hollow space 32 of housing 2. In this illustration can also be seen that the longitudinal section depicted in FIG. 1 extends along axes B-B.

The interference suppression filter and lightning current diverter device 1, as depicted and described in the embodiment example according to FIG. 1 and 2, has compact and minimal structural dimensions. It makes feasible high packing density of lines 5, 6 and no projecting structural parts are required. Housing 2, and therewith the entire device 1, can be developed in the form of a cylinder and no particular position orientation needs to be taken into consideration. Adjacent line guidances can be disposed close to one another without elements of the individual devices 1 mutually interfering with one another or damages occurring. This structural form can be protected against environmental effects in simple manner with shrinkable tubing. The device according to the invention simultaneously has residual pulses and residual energies which for all practical purposes can be neglected. If the interference suppression filter and lightning current diverter device 1 depicted as example is subjected to a standardized surge current (according to IEC 61000-4-5) with a wave form 8/20 μsec, there remains for example a residual voltage pulse of approximately 8 V and a residual energy of approximately 6 μJ at 25 kA diverter surge current. If a conventional device with a λ/4 shortcircuit conductor projecting at right angles, for the same frequency is subjected to the same test, this conventional device has a residual voltage pulse of 70 V and a residual energy of approximately 430 μJ at 25 kA diverter surge current. The device 1 according to the invention and depicted as example can simultaneously be laid out with respect to broadband for a frequency range of 0.8 to 2.5 GHz. This broadband layout can be applied in the entire application range of approximately 400 MHz up to the upper limit frequency of the plug connector. The outer diameter of housing 2 can be for example approximately 30 mm and the overall length between the two connectors 7 and 8 can be in the range of 50 to 60 mm.

Figure 3:
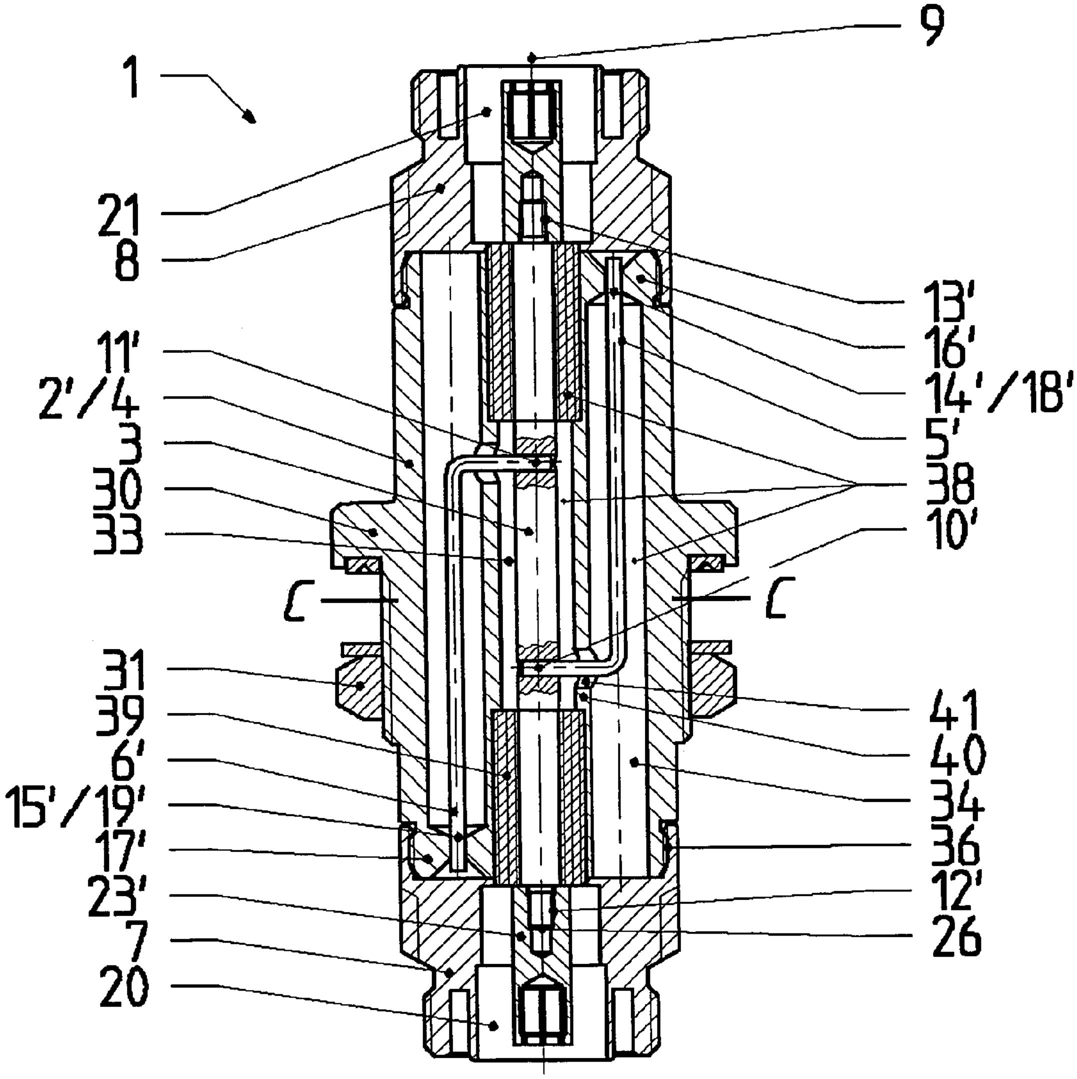

FIG. 3 shows a longitudinal section through a further embodiment of an interference suppression filter and lightning current diverter device 1 according to the invention. This device 1 comprises also at both ends connectors 7, 8 for coaxial cables. These connectors 7, 8 are connected with threaded connections 36 with a housing 2' and this detachable connection 36 makes possible assembling the elements installed in housing 2'.

Housing 2' has the form of a cylinder and includes a cylindrical core hollow space 33. In this core hollow space 33 the inner conductor 3 is centrally guided and retained by insulation body 39. The two ends of inner conductor 3 are electrically connected via connection sites 12' and 13' with the inner portion 26 of the connection elements 23'. These connection elements 23' are component parts of, on the one hand, connector 7 at the input side, as well as also of connector 8 on the output side and serve for the connection with the inner conductor of a coaxial cable. In the depicted example in housing 2' an additional hollow space 34 is included, which extends parallel to the core hollow space 33 for the inner conductor 3 and is positioned concentrically with inner conductor 3.

Figure 4:
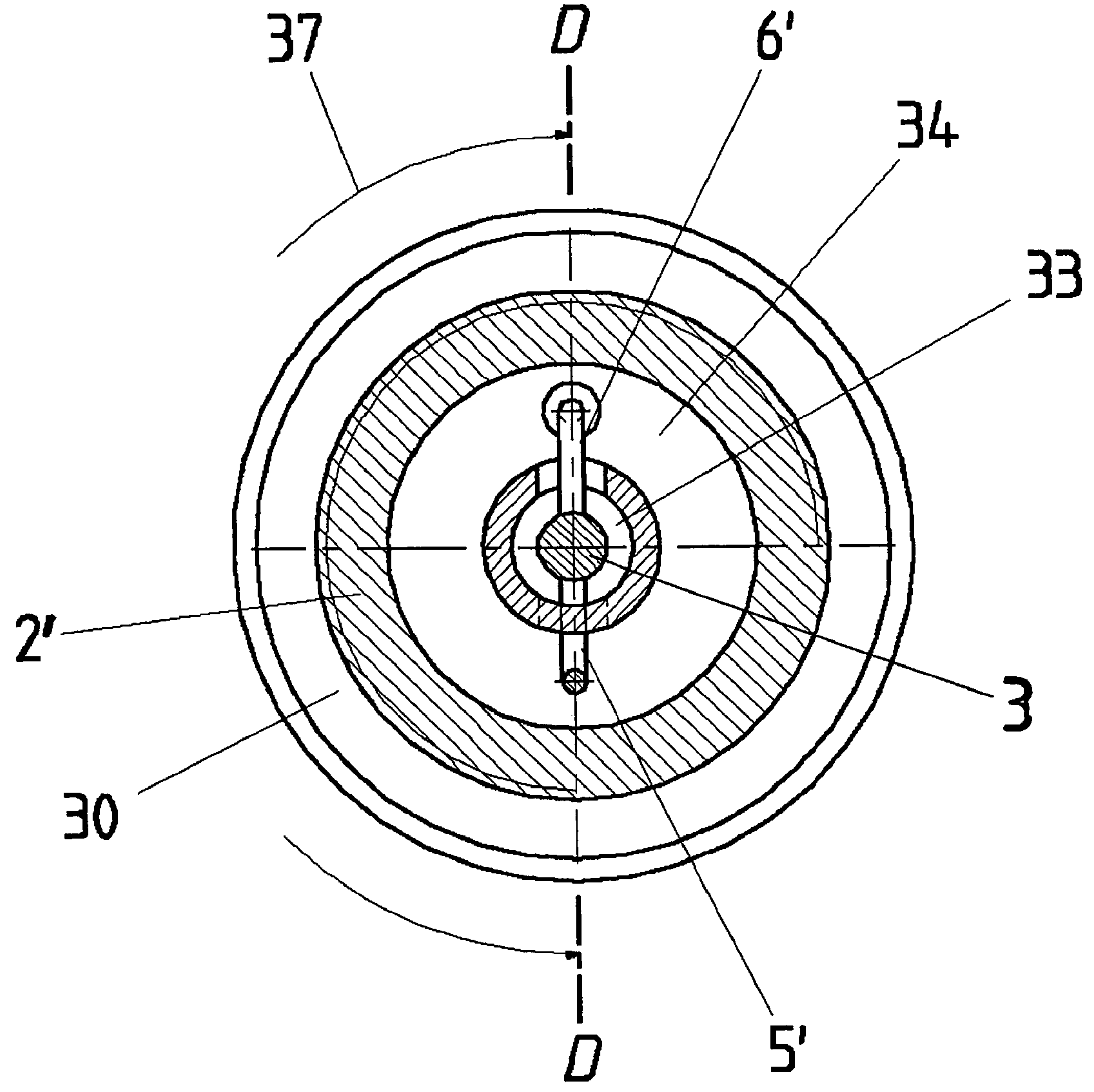

Disposition and cross sectional form of this additional hollow space 34 are evident in the cross section according to FIG. 4. FIG. 4 shows a cross section along line C—C in FIG. 3. The longitudinal section according to FIG. 3 shows a section along axes D—D in FIG. 4. In this additional hollow space 34 two lines 5' or 6', are disposed in the form of an electrically elongated λ/4 line. Both lines 5' and 6' have an angular interval 37 of 180° in a radial plane with respect to inner conductor 3. This angular interval 37 in this embodiment can also be varied and is selected such that optimum coupling between the two lines 5' and 6' is effected. Both lines 5' and 6' extend parallel to one another and overlap at least in a partial region. The inner ends 10' and 11' of the two lines 5' and 6' are retained in bores on inner conductor 3 and electrically connected with it. The two inner ends 10' and 11' of the two lines 5' and 6' are disposed in the direction of the longitudinal axis 9 of device 1 at the largest possible distance with respect to one another. The outer end 14' of line 5' is held in a contact portion 16' in housing 2' and is electrically connected with it. The outer end 15' of line 6' is also electrically connected with housing 2 via a corresponding contact portion 17'. In this embodiment also pulses, which are diverted from inner conductor 3 via lines 5' and 6' to the housing or ground, run counter to one another in lines 5' and 6'.

The result according to the invention is that the residual voltages and residual energies occurring at the output of the device are largely eliminated. The configuration according to FIG. 3 has the same advantages as have already been described in connection with the embodiment according to FIG. 1. This configuration additionally makes feasible a better high-frequency decoupling of the electric fields between the inner conductor 3 and the lines 5' and 6' by guiding the latter in a separate housing portion. This has additionally a positive effect on attaining a greater bandwidth. In the wall of the additional hollow space 34 slots 40 are worked in in the direction of the core hollow space 33, which slots extend from the particular outer end of the hollow space 33 or 34 to a throughlet 41 for lines 5' and 6', respectively.

These slots 40 permit the insertion and mounting of lines 5' and 6' into housing 2'. In this embodiment housing 2' also has a flange 30 and a threaded connection 31, which serve for the connection with an electrically conducting housing wall. Lines 5' and 6' are guided between their inner ends 10' and 11' as well as the outer ends 14' and 15' at a spacing from housing 2' and the surrounding air spaces act as dielectric 38.

Figure 5:
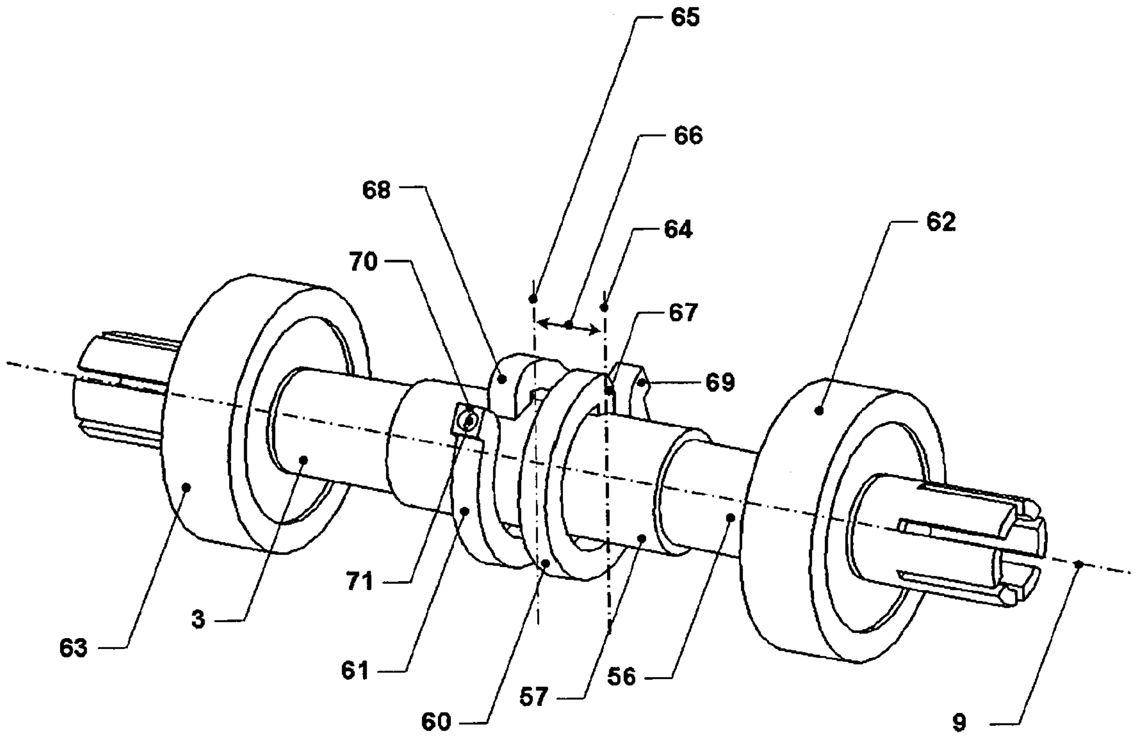

An embodiment example, with two lines 60, 61 each disposed in a radial plane, is shown schematically in FIG. 5. Housing 2 and the connectors 7, 8 at both housing ends are not shown here. But, in a manner obvious to a person skilled in the art, they are similar or identical to those depicted in FIG. 1. The inner conductor 3 is carried through the center of two insulation disks 62, 63.

These insulation disks 62, 63 position the inner conductor 3 in housing 2 and form each a dielectric. In the proximity of the inner conductor 3 between these two insulation disks 62 and 63, and therewith in the corresponding core hollow space of housing 2, two lines 60, 61 are disposed. These two lines 60, 61 are guided at a spacing and concentrically about the inner conductor 3 and therewith have a ring form. Each of the two lines 60, 61 lies in a radial plane, which is approximately at right angles to the inner conductor 3. The position of these two radial planes is indicated in FIG. 5 by the two radial axes 64, 65. The two radial planes or radial axes 64, 65 have a spacing 66 in the direction of the longitudinal axis 9 of the inner conductor 3, and in this interspace is a dielectric, in this case air.

At one end each of lines 60, 61 these are approximately bent over at an angle radially inwardly and via contact elements 67, 68 form a conducting connection with the inner conductor 3. At one opposing end of each of the two lines 60, 61 these are bent at an angle radially outwardly and form portions of contact elements 69, 70 with respect to housing 2. In the depicted example on these contact elements 69, 70 of the two lines 60, 61 threaded bores are located, into which, as shown in FIG. 1, engage machine screws, which are braced on housing 2 and connected with it so as to be electrically conducting. The ring-form course of both lines 60, 61 about the inner conductor 3 and the disposition of the inwardly directed contact elements 67, 68 is selected such that the diverted currents flowing from inner conductor 3 to housing 2 flow in the opposite direction in the two ring lines 60, 61.

The two lines 60, 61 are implemented in a manner known per se as λ/4 lines. This embodiment according to FIG. 5 makes feasible a highly compact mode of construction of the interference suppression filter and lightning current diverter device 1, since it can be built highly compactly in the direction of the longitudinal axis 9 of the inner conductor 3 as well as also in the radial direction with respect to it. But the device simultaneously has also the advantage that the length and the cross section of the two lines 60, 61 can be adapted in simple manner to different requirements, and the cross section can be implemented differently over the length.

Lines 60, 61 and contact elements 67, 68 and 69, 70, respectively, at the two ends form different line sections via which the HF transmission properties, in particular the bandwidth and the frequency range, can be determined. Via the different line sections 56, 57 and the dielectric between inner conductor 3 and housing 2 the characteristics can be determined in a manner known per se over the bandwidth of the high-frequency transmission.

Figure 6:
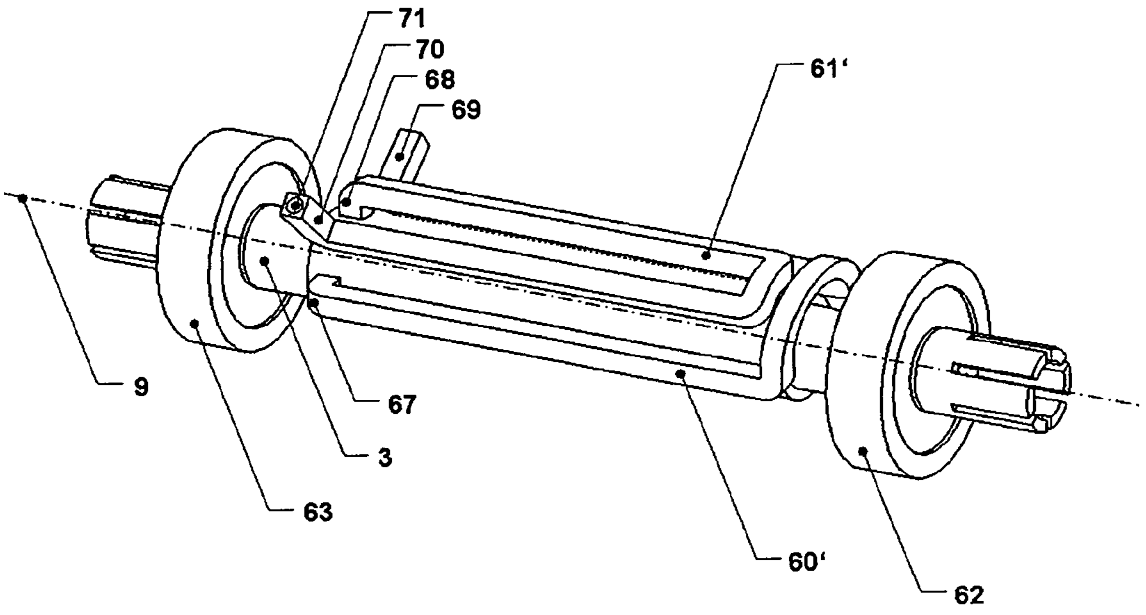

FIG. 6 depicts schematically a further solution. Here also the housing 2 and the connectors 7, 8 at both ends of housing 2 have been omitted. Housing 2 is here implemented similarly or identically to that shown in FIG. 1. In this embodiment example the inner conductor 3 is also guided through two insulation disks 62, 63 and positioned in housing 2. In the proximity of inner conductor 3 between these two insulation disks 62, 63 two lines 60' and 61' are disposed in the form of loops parallel to one another.

The two lines 60' and 61' are spaced apart and separated from one another by a dielectric. The two parallel line loops are disposed in a common surface. This surface is either a shell surface extending at a spacing to the inner conductor 3 or a flat tangential surface extending parallel and at a distance to the inner conductor 3 or a surface with an arbitrary curvature about the inner conductor 3. At one end each of the two lines 60' and 61' contact elements 67, 68 are disposed, which form the electric connection with respect to the inner conductor 3. At the two opposing ends of the two lines 60' and 61' contact elements 69 and 70 are disposed, which ensure the electric connection with respect to housing 2. For this purpose in these contact elements 60, 70 threaded bores 71 are disposed, which engage machine screws cooperating with housing 2. Through the loop-form configuration of the two lines 60' and 61' in a surface disposed at a spacing from inner conductor 3, the device can also be implemented shorter in the direction of the longitudinal axis 9 of inner conductor 3.

As described in connection with FIG. 5, through the different geometric implementations of the lines 60' and 61' as well as of the contact elements 67, 68 or 69, 70, respectively, as well as of inner conductor 3 and the dielectric between inner conductor 3 and housing 2, the properties and characteristics of the HF transmission can also be affected. According to the invention the two lines 60' and 61' are connected via contact elements 67, 68 with the inner conductor 3 such that potential currents flow in opposite directions in the two lines 60' and 61'. Thereby the advantages and improved properties of the device described in connection with FIG. 1, or 3, respectively, are ensured.

Figure 7:
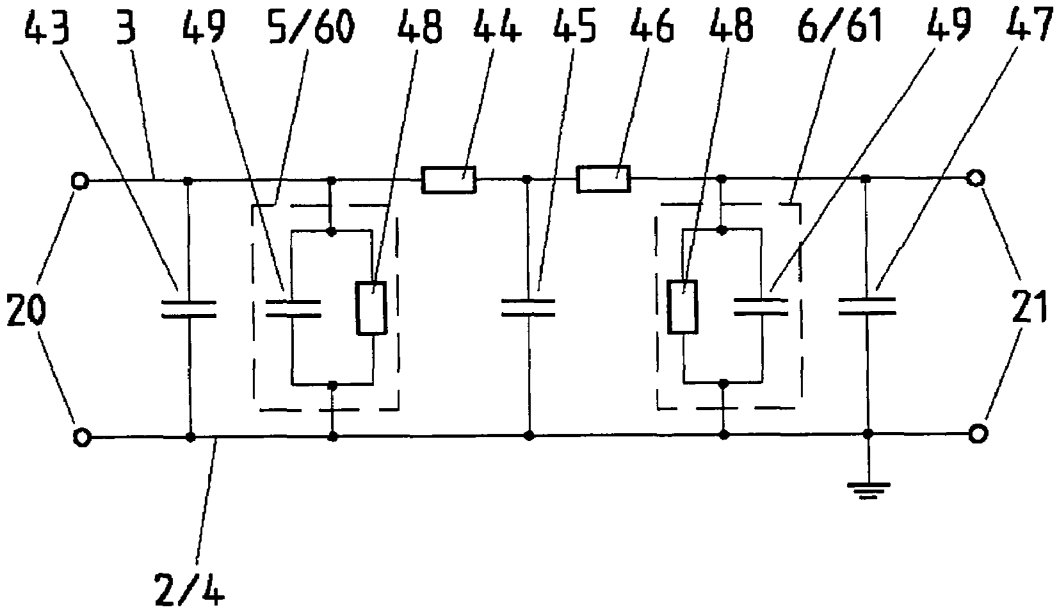

FIG. 7 depicts an equivalent circuit diagram of a high-frequency device according to the invention according to FIG. 1 or FIG. 3, respectively. Between the input side 20 and the output side 21 extend the inner conductor 3 and the outer conductor 4. In this region the outer conductor 4 is formed by housing 2. The input or output side 20 or 21, respectively, are defined according to the direction of the pulse, i.e. the input side 20 is, for example, directed toward the antenna and the output side 21 toward the apparatus to be protected.

The main path formed by the inner conductor 3 comprises a capacitance 43, an inductance 44 and a capacitance 45, an inductance 46 and a further capacitance 47. These have different reactance values. Lines 5, 6 and 60, 61, respectively, are λ/4 shortcircuit conductors and in the equivalent circuit diagram are each depicted by an inductance 48 and a parallel-connected capacitance 49. Outer conductor 4, or housing 2, are connected to ground.

Figure 8:
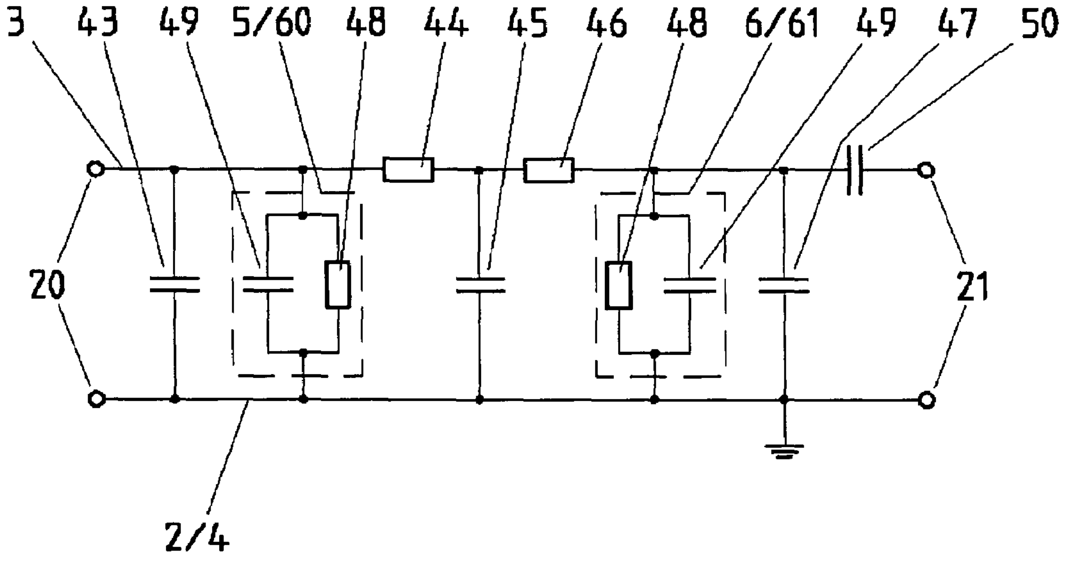
Figure 9:
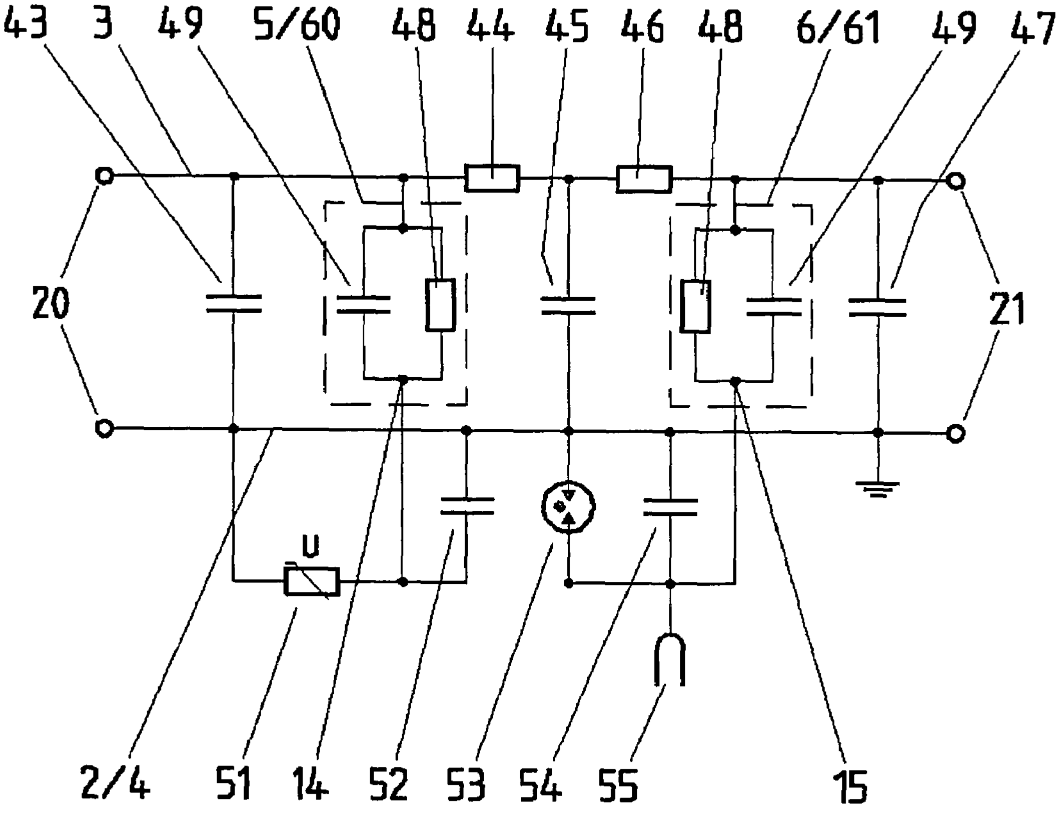

In FIG. 8 the same equivalent circuit diagram as in FIG. 7 is shown, however, additionally, in front of the output 21 of the main lead or of the inner conductor 3 a capacitor 50 is implemented. This capacitor 50 forms in a manner known per se a highpass filter and serves for reducing the residual energy even further, for example by the factor 20. FIG. 9 shows an equivalent circuit diagram for a device 1 according to the invention, in which additionally voltage-diverting and voltage-limiting elements are installed.

These elements, in addition to the equivalent elements described in connection with FIGS. 7 and 8, are disposed at the output end of lines 5 and 6, respectively, or 60 and 61, respectively. At the outer end 14 of line 5 and 6, respectively, is provided a pulse diverting element 51 in the form of a varistor and, parallel to it, a capacitor 52. At the outer end 15 of line 6 and 61, respectively, a pulse-diverting element 53 in the form of a gas discharge diverter is provided, and, parallel to it, a capacitor 54. The pulse-diverting element 51 on line 5 and 60, respectively, formed in FIG. 9 by a varistor, can also be replaced by another voltage-diverting element, for example by a diode, in particular a TransZorb diode.

The disposition according to the invention of two parallel lines 5, 6 and 60, 61, respectively permits the parallel combination of different pulse-diverting elements, which can be tuned to one another in a manner known per se. Thereby the response behavior can be improved, the extinction reliability can be increased and the dynamic response voltage can be kept low. A varistor (or TransZorb diode) 51, selected to be slightly above the statistical response voltage of the gas diverter 53, has a faster dynamic response behavior than a gas diverter 53.

This leads, on the one hand, to a lower dynamic response voltage and, additionally prevents in the presence of the more frequently occurring low energy overvoltages, such as for example switching actions, a response or igniting-through of the gas diverter 53. This reduces the failure probability of the installation through a possible nonextinction of the diverter 53.

With high energy overvoltages through the characteristic typical of the structural part a voltage drop is generated across the varistor 51 or the TransZorb diode, which reliably ignites the gas diverter 53 and protects the varistor 51 or the TransZorb diode against overloads and simultaneously ensures a secure protection of the connected apparatus. The configuration according to FIG. 9 also permits the combination with a DC feed 55. The additional pulse-diverting elements 51, 53 are decoupled in the transmissable frequency range.

The discrete equivalent components depicted in the equivalent circuit diagrams in FIG. 7 to 9 can be present in reality or they are realized by different line lengths and impedances, as is shown in the embodiment examples according to FIG. 1 to 6.

What is claimed is:

1. Interference suppression filter and lightning current diverter device in a cable for the transmission of signals, comprising:

a housing with two cable connectors, each connector provided on opposite ends of the device, the housing forming an outer conductor connected to ground, and comprising an inner conductor guided through the housing;

a connection provided between the inner conductor and housing, wherein the connection comprises at least one pair of two lines;

wherein the two lines are disposed such that at least a region of the lines are substantially parallel with respect to one another, and are insulated against one another;

wherein each line comprising at one end a first contact element for providing electrical connection to the inner conductor and at the other end a second contact element for providing electrical connection to the housing;

wherein the second contact elements of the two lines are connected to different parts of the housing; and wherein the contact elements are disposed such that the directions of flow of the currents in the parallel region(s) of the two lines are directed counter one another.

2. Interference suppression filter and lightning current diverter device as claimed in claim 1, wherein the lines are disposed approximately parallel to the inner conductor and on a cylindrical surface concentric with the inner conductor, the two first contact elements of the two lines connected with the inner conductor are disposed spaced apart from one another in the direction of the longitudinal axis of the inner conductor, and the two lines, starting from the first contact elements, are directed counter to one another.

3. Interference suppression filter and lightning current diverter device as claimed in claim 1, wherein the housing comprises a cylindrical core hollow space, and wherein the inner conductor and the lines are disposed at a spacing from one another in the core hollow space.

4. Interference suppression filter and lightning current diverter device as claimed in claim 1, wherein the housing comprises a first cylindrical core hollow space guided through the inner conductor, and a second hollow space extending approximately parallel to the first core hollow space, and wherein each of the lines is guided individually in the second hollow space.

5. Interference suppression filter and lightning current diverter device as claimed in claim 1, wherein the two lines are each disposed in a radial plane and extend concentrically with the inner conductor, the two radial planes are disposed approximately at right angles to the inner conductor and at a spacing with respect to one another, the first contact elements provided at one end of each of the two lines are directed approximately radially inwardly, and the second contact elements provided at the other end of each of the two lines are directly approximately radially outwardly.

6. Interference suppression filter and lightning current diverter device as claimed in claim 1, wherein the two lines are in the form of loops and are approximately parallel to one another in a common surface, the surface extending at a spacing to the inner conductor and disposed concentrically or parallel tangentially to the inner conductor, the first contact elements at one end of each of the two lines are directed approximately radially toward the inner conductor and are connected with the inner conductor, and the second contact elements at the other end of each of the two lines are connected with the housing.

7. Interference suppression filter and lightning current diverter device as claimed in claim 1, wherein the two lines are λ/4 short circuit lines.

8. Interference suppression filter and lightning current diverter device as claimed in claim 1, wherein the two lines are electrically elongated λ/4 short circuit lines.

9. Interference suppression filter and lightning current diverter device as claimed in claim 1, wherein each line comprises a capacitance and an inductance forming a parallel resonance circuit.

10. Interference suppression filter and lightning current diverter device as claimed in claim 1, wherein a capacitance is provided between the two first contact elements and the two lines, and wherein the inner conductor comprises a capacitance and an inductance.

11. Interference suppression filter and lightning current diverter device as claimed in claim 1, wherein a capacitor is provided on one end of the inner conductor.

12. Interference suppression filter and lightning current diverter device as claimed in claim 1, wherein a capacitor and a pulse-diverting element interconnected in parallel with the capacitor are provided between the second contact elements and the housing.

13. Interference suppression filter and lightning current diverter device as claimed in claim 1, wherein the lines and the contact elements form different line sections and determine the bandwidth and the frequency range of the signal transmission.

14. Interference suppression filter and lightning current diverter device as claimed in claim 1, wherein the inner conductor comprises different line sections, and the device comprises a dielectric material, and wherein the different line sections and the dielectric material about the inner conductor determine the characteristic over the bandwidth of the signal transmission.

15. Interference suppression filter and lightning current diverter device as claimed in claim 1, wherein the device comprises at least one pair of lines installed between inner conductor and housing.

16. Interference suppression filter and lightning current diverter device as claimed in claim 12, wherein the pulse-diverting element is a gas discharge diverter or a varistor or a diode, and across the pulse-diverting element and the capacitor a DC feed is disposed.

17. Interference suppression filter and lightning current diverter device as claimed in claim 1, wherein the lines, the inner conductor a the housing are separated from one another by dielectric material.

18. Interference suppression filter and lightning current diverter device as claimed in claim 1, wherein, with the exception of the first and second contact elements at the ends of the two lines, all effective structural elements are disposed concentrically to the longitudinal axis of the inner conductor or of the device, or parallel to the longitudinal axis.

19. Interference suppression filter and lightning current diverter device as claimed in claim 1, wherein the two lines are disposed such that at least a region of the lines are substantially overlapping with respect to one another.

20. Interference suppression filter arid lightning current diverter device as claimed in claim 1, wherein one of the ends of the lines are electrically connected to the inner conductor at different points on the inner conductor.

* * * * *